United States Patent
Guo et al.

(10) Patent No.: US 12,430,793 B2
(45) Date of Patent: Sep. 30, 2025

(54) METHOD AND APPARATUS WITH FACE LANDMARK COORDINATE PREDICTION

(71) Applicant: Samsung Electronics Co., Ltd., Suwon-si (KR)

(72) Inventors: Zidong Guo, Xi'an (CN); Jae-Joon Han, Suwon-si (KR); Seon-Min Rhee, Suwon-si (KR); Seungju Han, Suwon-si (KR); Hui Li, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 408 days.

(21) Appl. No.: 17/987,152

(22) Filed: Nov. 15, 2022

(65) Prior Publication Data

US 2023/0154040 A1    May 18, 2023

(30) Foreign Application Priority Data

Nov. 16, 2021 (CN) .......................... 202111358107.X
Oct. 12, 2022 (KR) .......................... 10-2022-0130309

(51) Int. Cl.
*G06T 7/73* (2017.01)
*G06V 10/766* (2022.01)
(Continued)

(52) U.S. Cl.
CPC .............. *G06T 7/73* (2017.01); *G06V 10/766* (2022.01); *G06V 10/7715* (2022.01);
(Continued)

(58) Field of Classification Search
CPC ............. G06T 7/73; G06T 2207/20081; G06T 2207/20084; G06T 2207/30201;
(Continued)

(56) References Cited

U.S. PATENT DOCUMENTS 9,400,922 B2    7/2016    Zhou et al.
10,380,414 B2    8/2019    Yao et al.
(Continued)

FOREIGN PATENT DOCUMENTS

CN    103443804 A    12/2013
CN    105809107 A    7/2016
(Continued)

OTHER PUBLICATIONS

Jin, H., Li, J., Liao, S., & Shao, L. (2021). When Liebig's Barrel Meets Facial Landmark Detection: A Practical Model. arXiv preprint arXiv:2105.13150; hereafter referred to as Jin (Year: 2021).*
(Continued)

*Primary Examiner* — Nay A Maung
*Assistant Examiner* — Vaisali Rao Koppolu
(74) *Attorney, Agent, or Firm* — NSIP Law

(57) ABSTRACT

A method and apparatus with landmark coordinate prediction are provided. The method includes generating a multi-stage feature map for landmarks of a face image through a staged convolutional network, generating an initial query matrix by fully connecting a last-stage feature map in the multi-stage feature map using a fully connected network, where a total number of feature elements in the initial query matrix is equal to a total number of predicted landmarks of the face image, generating a memory feature matrix by flattening and connecting the multi-stage feature map, generating the predicted landmark coordinates by inputting the memory feature matrix and the initial query matrix to a decoder network of plural cascaded decoder networks.

20 Claims, 5 Drawing Sheets

(51) Int. Cl.
  *G06V 10/77*   (2022.01)
  *G06V 10/774*  (2022.01)
  *G06V 10/776*  (2022.01)
  *G06V 10/82*   (2022.01)
  *G06V 40/16*   (2022.01)

(52) U.S. Cl.
  CPC .......... *G06V 10/774* (2022.01); *G06V 10/776* (2022.01); *G06V 10/82* (2022.01); *G06V 40/169* (2022.01); *G06V 40/171* (2022.01); *G06T 2207/20081* (2013.01); *G06T 2207/20084* (2013.01); *G06T 2207/30201* (2013.01)

(58) Field of Classification Search
  CPC ............. G06V 10/766; G06V 10/7715; G06V 10/774; G06V 10/776; G06V 10/82; G06V 40/169; G06V 40/171; G06N 3/0455; G06N 3/0464; G06N 3/0475; G06N 3/09
  See application file for complete search history.

(56) References Cited

U.S. PATENT DOCUMENTS

| | | | |
|---|---|---|---|
| 2014/0050358 A1 | 2/2014 | Liu et al. | |
| 2015/0347822 A1* | 12/2015 | Zhou | G06V 10/82 |
| | | | 382/118 |
| 2016/0042223 A1 | 2/2016 | Suh et al. | |
| 2019/0026538 A1* | 1/2019 | Wang | G06V 40/172 |
| 2020/0058171 A1 | 2/2020 | Du | |
| 2021/0056701 A1* | 2/2021 | Vranceanu | G06V 40/165 |
| 2023/0245329 A1* | 8/2023 | Miao | G06T 7/162 |
| | | | 382/103 |

FOREIGN PATENT DOCUMENTS

| | | |
|---|---|---|
| CN | 112528978 A | 3/2021 |
| KR | 10-2077260 B1 | 2/2020 |

OTHER PUBLICATIONS

Zhang, Kaipeng, et al. "Joint face detection and alignment using multitask cascaded convolutional networks." *IEEE signal processing letters* vol. 23. Issue 10 (2016). pp 1-5.

Kumar, Amit, et al. "Disentangling 3D pose in a dendritic cnn for unconstrained 2d face alignment." arXiv:1802.06713v3 (2018). pp 1-14.

Jin, Haibo, et al. "When Liebig's Barrel Meets Facial Landmark Detection: A Practical Model." arXiv:2105.13150v2, Jun. 2, 2021, (11 pages in English).

Khan, Salman, et al. "Transformers in Vision: A Survey." ACM computing surveys (CSUR) 54.10s, arXiv:2101.01169v4, Oct. 3, 2021, (30 pages in English).

Extended European search report issued on Apr. 18, 2023, in counterpart European Patent Application No. 22207711.7 (7 pages in English).

Chinese Office Action Issued on Mar. 22, 2025, in Counterpart Chinese Patent Application No. 202111358107.X (9 Pages in English, 8 Pages in Chinese).

* cited by examiner

METHOD AND APPARATUS WITH FACE LANDMARK COORDINATE PREDICTION

CROSS-REFERENCE TO RELATED APPLICATIONS

This application claims the benefit under 35 USC § 119(a) of Chinese Patent Application No. 202111358107.X filed on Nov. 16, 2021, in the China National Intellectual Property Administration, and Korean Patent Application No. 10-2022-0130309 filed on Oct. 12, 2022, in the Korean Intellectual Property Office, the entire disclosures of which are incorporated herein by reference for all purposes.

BACKGROUND

1. Field

The following disclosure relates to technologies involving face landmark detection, and more particularly, to a method and apparatus with face landmark coordinate prediction.

2. Description of Related Art

Face landmark detection aims to automatically locate landmark of a face. The face landmark detection may be a part of face analysis tasks such as a face recognition, a facial expression analysis, a face frontalization, and a three-dimensional (3D) face reconstruction. Face landmark detection may also be used for face alignment.

Existing face landmark detection approaches are mainly divided into a typical coordinates regression-based approach and a typical heat map regression-based approach.

In the typical coordinate regression-based approach, an image may be mapped directly to landmark coordinates through a machine learning model, such as a deep neural network that includes one or more convolution layers. Continuing with this deep neural network example, a direct mapping of the image features to coordinates may be performed through one or more fully connected prediction layers. To increase a detection accuracy, coordinate regression aspects may be further implemented in a cascaded manner or through heat map regression consideration.

In the typical heat map regression-based approach, a heat map is generated based on given landmark coordinates used as a proxy for a ground-truth (GT) value. Here, each heat map represents a probability of a landmark location. A heat map regression-based approach generally predicts a heat map through a convolutional network, e.g., with a deep convolutional neural network, and then obtains landmarks based on peak value probability positions in the heat map. A spatial structure of image features may be maintained in the typical heat map regression-based approach, and accordingly the typical heat map regression-based approach generally has performance higher than that of the typical coordinate regression-based approach.

Although the typical heat map regression-based approach may have a relatively higher accuracy than the typical coordinate regression-based approach, there are drawbacks to the use of such a heat map regression-based approach. For example, a post-processing operation is required in the typical heat map regression-based approach to map a heat map probability output to coordinates, but since the post-processing operation is non-differentiable, this prevents end-to-end training of the entire framework. Further, considering the complexity of the required calculations within the typical heat map regression-based approach, a resolution of a heat map is generally lower than a resolution of a corresponding input image, quantization errors may inevitably occur and prevent further improvement. Additionally, generation of a manually designed GT value heat map in the typical heat map regression-based approach may require heuristic hyper-parameters that have to be tuned.

The typical coordinate regression-based approach may bypass the above-described limitations and implement end-to-end model training. However, if a fully connected prediction layer is used in the typical coordinate regression-based approach, the spatial structure of image features may be destroyed. Further, mapping from global features to landmark coordinates in the typical coordinate regression-based approach may have to consider that features and predictions in this approach may not be aligned, so localization performance may decrease.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes generating a multi-stage feature map for landmarks of a face image through a staged convolutional network, generating an initial query matrix by fully connecting a last-stage feature map in the multi-stage feature map using a fully connected network, where a total number of feature elements in the initial query matrix is equal to a total number of predicted landmarks of the face image, generating a memory feature matrix by flattening and connecting the multi-stage feature map, and generating the predicted landmark coordinates by inputting the memory feature matrix and the initial query matrix to a decoder network of plural cascaded decoder networks.

The multi-stage feature map may include pyramid features that represent extracted local features of the face image and extracted global features of the face image.

The decoder networks, including a first decoder network and two or more second decoder networks, may be configured as cascaded transformers and may each include a self-attention portion and a landmark coordinate prediction portion, and each of the two or more second decoder networks may further include a deformable attention portion, and the generating of the predicted landmark coordinates may further include inputting the initial query matrix and the initial query matrix embedded with position information to a first self-attention portion of the first decoder network, as inputs among query, key, and value inputs of the first self-attention portion, generating an output of a corresponding deformable attention portion of a second decoder network, of the two or more second decoder networks, by implementing the deformable attention portion provided an output of a second self-attention portion of the second decoder network, a memory feature matrix, and first landmark coordinates predicted by the first decoder network to the corresponding deformable attention portion of the second decoder network, where the output of the second self-attention portion and the memory feature matrix may be respective query and value inputs of the corresponding deformable attention network, inputting the output of the corresponding deformable attention portion of the second decoder network and the output of the corresponding deformable attention portion with the embedded position information to another self-attention portion of another second decoder network, of the two or more second decoder networks, as inputs among query, key, and value inputs to the other self-attention portion, and generating other second landmark coordinates of the face image predicted by the other second decoder network by providing information, based on the output of the corresponding deformable attention portion of the second decoder network, to a corresponding landmark coordinate prediction portion of the other second decoder network, where landmark coordinates predicted by a cascaded last decoder network, of the two or more second decoder networks, may be last predicted landmark coordinates of a final face image corresponding to the face image.

An output of a respective self-attention portion, of the decoder networks, may be an output matrix obtained in accordance with the following equation:

$$q_i^E = \sum_{j=1}^{N} \alpha_{ij} q_j, i = 1, 2, \ldots N$$

wherein $q_i^E$ denotes an i-th row vector of the output matrix, $\alpha_{ij}$ denotes an attention weight obtained by normalizing a dot product of an i-th row vector of a query matrix input to the respective self-attention portion and a j-th row vector of a key matrix input to the respective self-attention portion, $q_j$ denotes a j-th row vector of the initial query matrix or a query matrix based on an output matrix of a previous deformable attention portion of a previous second decoder network, of the two or more second decoder networks, and N denotes the total number of predicted landmarks of the face image.

An output of one deformable attention portion, of a corresponding decoder network among the two or more second decoder networks, may be another output matrix obtained in accordance with the following equation:

$$f_i = \sum_{k=1}^{K} \beta_{ik} x_{ik}, i = 1, \ldots, N$$

wherein $f_i$ denotes an updated feature of an i-th landmark of an output matrix of a corresponding previous decoder network, of the decoder networks, $\beta_{ik}$ denotes an attention weight obtained by performing a fully connected operation and a softmax operation on a query matrix input to the one deformable attention portion, $x_{ik}$ denotes a feature corresponding to coordinates of a k-th reference point in the memory feature matrix, and K denotes a preset value, wherein a position offset between the coordinates of the k-th reference point and i-th landmark coordinates in landmark coordinates predicted by the corresponding previous decoder network is obtained by providing a result, of a fully connected operation on an output matrix of another deformable attention portion of the corresponding previous decoder network, to a corresponding landmark coordinate prediction portion of the corresponding previous decoder network.

Corresponding landmark coordinates predicted by a corresponding second decoder network, among the two or more second decoder networks, may be obtained in accordance with the following equation:

$$y = \sigma(y_O + \sigma^{-1}(y_R))$$

wherein y denotes landmark coordinates predicted by the corresponding second decoder network, $y_R$ denotes initial landmark coordinates predicted by the first decoder network or previous landmark coordinates predicted by a previous second decoder network, among the two or more decoder networks, and $y_O$ denotes an output of a landmark coordinate prediction portion of the corresponding second decoder network indicating an offset of y with respect to $y_R$.

The method may further include training the convolutional neural network, the fully connected layer, and at least one decoder network of the decoder networks using a training image sample based on the following regression loss function:

$$L_{reg} = \sum_{l=0}^{L_d} \|y_l - \hat{y}\|$$

wherein $L_{reg}$ denotes a regression loss, $y_l$ denotes landmark coordinates of a training image sample predicted by an in-training decoder network, $\hat{y}$ denotes actual landmark coordinates of the training image sample, $L_d$ denotes a total number of in-training decoder networks, and l denotes an index of the in-training decoder network among the in-training decoder networks.

In one general aspect, provided is a non-transitory computer-readable storage medium storing instructions that, when executed by a processor, configures the processor to implement any one, combination, or all operations or methods described herein.

In one general aspect, an apparatus includes a processor configured to execute instructions, and a memory configured to store the instructions, which when executed by the processor configure the processor to generate a multi-stage feature map for landmarks of a face image through a staged convolutional network, generate an initial query matrix by fully connecting a last-stage feature map in the multi-stage feature map using a fully connected network, where a total number of feature elements in the initial query matrix is equal to a total number of predicted landmarks of the face image, generate a memory feature matrix by flattening and connecting the multi-stage feature map, and generate the predicted landmark coordinates by inputting the memory feature matrix and the initial query matrix to a decoder network of plural cascaded decoder networks.

The multi-stage feature map may include pyramid features that represent extracted local features of the face image and extracted global features of the face image.

The decoder networks, including a first decoder network and two or more second decoder networks, may be configured as cascaded transformers and each may include a self-attention portion and a landmark coordinate prediction portion, and each of the two or more second decoder networks further includes a deformable attention portion, wherein, for implementation of the self-attention portion of an initial operation of the decoder network, the processor may be configured to input the initial query matrix and the initial query matrix embedded with position information to a first self-attention portion of the first decoder network, as inputs among query, key, and value inputs of the first self-attention portion, generate an output of a corresponding deformable attention portion of a second decoder network, of the two or more second decoder networks, by implementing the deformable attention portion provided an output of a second self-attention portion of the second decoder network, a memory feature matrix, and first landmark coordinates predicted by the first decoder network to the corresponding deformable attention portion of the second decoder network, where the output of the second self-attention portion and the memory feature matrix may be respective query and value inputs of the corresponding deformable attention network, input the output of the corresponding deformable attention portion of the second decoder network and the output of the corresponding deformable attention portion with the embedded position information to another self-attention portion of another second decoder network, of the two or more second decoder networks, as inputs among query, key, and value inputs to the other self-attention portion, generate second landmark coordinates of the face image predicted by the other second decoder network by providing information, based on the output of the corresponding deformable attention portion of the other second decoder network, to a corresponding landmark coordinate prediction portion of the other second decoder layer, where landmark coordinates predicted by a cascaded last decoder network, of the two or more second decoder networks, may be last predicted landmark coordinates of a final face image corresponding to the face image.

The processor may be further configured to generate an output of a respective self-attention portion, of the decoder networks, in accordance with the following equation:

$$q_i^E = \sum_{j=1}^{N} \alpha_{ij} q_j, i = 1, 2, \ldots N$$

wherein $q_i^E$ denotes an i-th row vector of the output matrix, $\alpha_{ij}$ denotes an attention weight obtained by normalizing a dot product of an i-th row vector of a query matrix input to the respective self-attention portion and a j-th row vector of a key matrix input to the respective self-attention portion, $q_j$ denotes a j-th row vector of the initial query matrix or a query matrix based on an output matrix of a previous deformable attention portion of a previous second decoder network, of the two or more second decoder networks, and N denotes the total number of predicted landmarks of the face image.

The processor may be further configured to generate an output of one deformable attention portion, of a corresponding decoder network among the two or more second decoder networks, in accordance with the following equation:

$$f_i = \sum_{k=1}^{K} \beta_{ik} x_{ik}, i = 1, \ldots, N$$

wherein $f_i$ denotes an updated feature of an i-th landmark of an output matrix of a corresponding previous decoder network, of the decoder networks, $\beta_{ik}$ denotes an attention weight obtained by performing a fully connected operation and a softmax operation on a query matrix input to the one deformable attention portion, $x_{ik}$ denotes a feature corresponding to coordinates of a k-th reference point in the memory feature matrix, and K denotes a preset value, wherein a position offset between the coordinates of the k-th reference point and i-th landmark coordinates in landmark coordinates predicted by the corresponding previous decoder network is obtained by providing a result, of a fully connected operation on an output matrix of another deformable attention portion of the corresponding previous decoder network, to a corresponding landmark coordinate prediction portion of the corresponding previous decoder network.

The processor may be further configured obtain corresponding landmark coordinates predicted by a corresponding second decoder network, among the two or more second decoder networks, in accordance with the following equation:

$$y = \sigma(y_O + \sigma^{-1}(y_R))$$

wherein y denotes landmark coordinates predicted by the corresponding second decoder network, $y_R$ denotes initial landmark coordinates predicted by the first decoder network or previous landmark coordinates predicted by a previous second decoder network, among the two or more decoder networks, and $y_O$ denotes an output of a landmark coordinate prediction portion of the corresponding second decoder network indicating an offset of y with respect to $y_R$.

The processor may be further configured to train the convolutional neural network layer, the fully connected layer, and at least one decoder network of the decoder networks, as respective neural network models, using a training image sample based on the following regression loss function:

$$L_{reg} = \sum_{l=0}^{L_d} \|y_l - \hat{y}\|$$

wherein $L_{reg}$ denotes a regression loss, $y_l$ denotes landmark coordinates of a training image sample predicted by an in-training decoder network, $\hat{y}$ denotes actual landmark coordinates of the training image sample, $L_d$ denotes a total number of in-training decoder networks, and l denotes an index of the in-training decoder network among the in-training decoder networks.

In one general aspect, an apparatus includes a processor configured to execute instructions, and memory storing the instructions, which when executed by the processor configure the processor to, for each decoder model of plural cascaded decoder models, implement a first attention mechanism based on landmark feature information for an input face image, implement a second attention mechanism, dependent on the first attention mechanism, to generate updated feature information dependent on multi-stage feature information for the face image and landmark coordinate information from a previous decoder model of the cascaded decoder models, and generate predicted landmark coordinates, or predicted landmark coordinate offsets, for the face image based on the generated updated feature information, where, for one of the decoder models, the landmark feature information is based on other feature information generated through an attention mechanism applied to initial query information having features extracted from a spatial dimension of features of a feature map generated by a multi-stage feature extraction model for the face image, and where, for another one of the decoder models, the landmark feature information is updated feature information generated by a previous decoder model of the decoder models.

The multi-stage feature information may represent features extracted by different stages, having different receptive fields, of the multi-stage feature extraction model.

The different receptive fields may represent at least global and local features being extracted by the multi-stage feature extraction model, and the feature map generated by the multi-stage feature extraction model may include the extracted global features.

The implementation of the first attention mechanism may be based on the landmark feature information embedded with position information.

A total number of the landmark feature information may be equal to a total number of the predicted landmark coordinates.

Other features and aspects will be apparent from the following detailed description, the drawings, and the claims.

Figure 1:
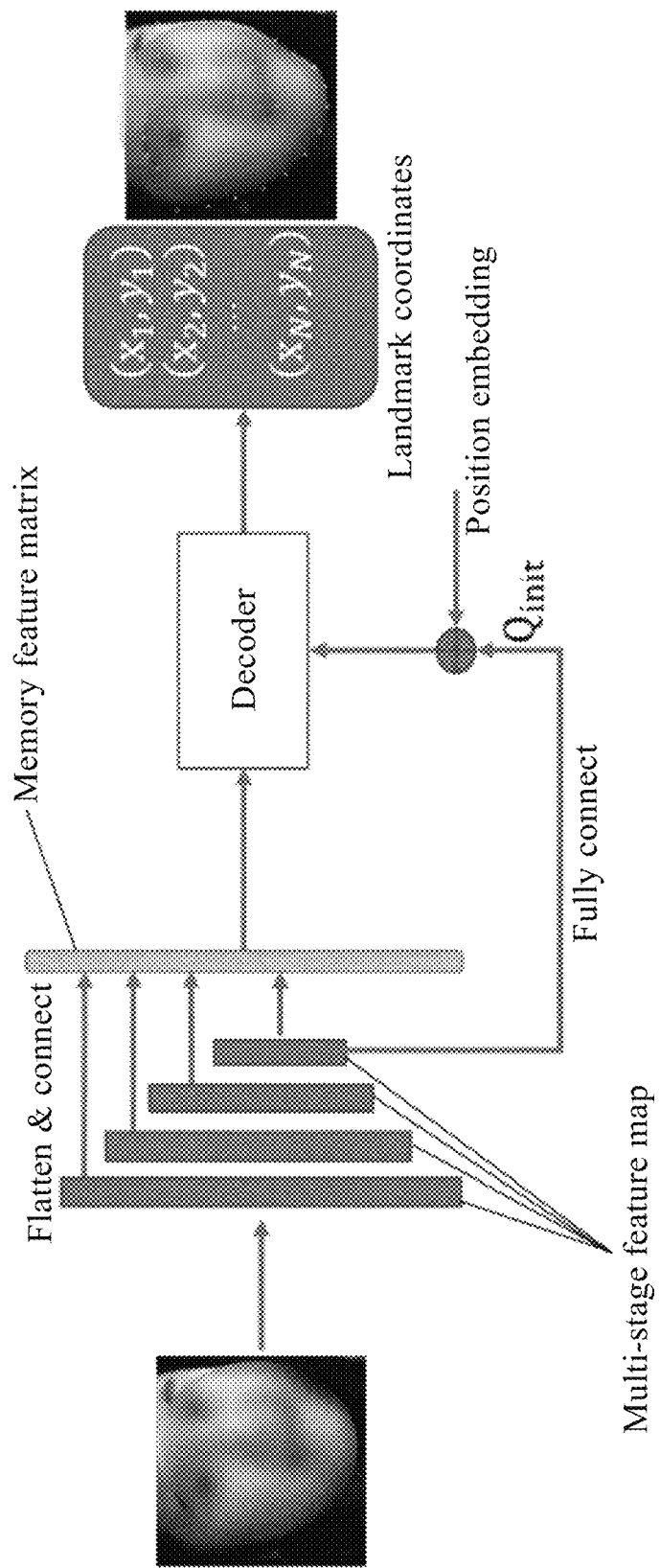
FIG. 1 illustrates an example network configuration and method with face landmark coordinate prediction.

Throughout the drawings and the detailed description, unless otherwise described or provided, the same drawing reference numerals may be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third", or A, B, (a), (b), and the like may be used herein to describe various members, components, regions, layers, portions, or sections, these members, components, regions, layers, portions, or sections are not to be limited by these terms. Each of these terminologies is not used to define an essence, order, or sequence of corresponding members, components, regions, layers, portions, or sections, for example, but used merely to distinguish the corresponding members, components, regions, layers, portions, or sections from other members, components, regions, layers, portions, or sections. Thus, a first member, component, region, layer, portions, or section referred to in the examples described herein may also be referred to as a second member, component, region, layer, portions, or section without departing from the teachings of the examples.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. As used herein, the term "and/or" includes any and all combinations of one or more of the associated listed items. For example, "A and/or B" may be interpreted as "A," "B," or "A and B."

The singular forms "a," "an," and "the" are Intended to refer to the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof. However, the use of the term "may" herein with respect to an example or embodiment, e.g., as to what an example or embodiment may include or implement, means that at least one example or embodiment exists where such a feature is included or implemented, while all examples are not limited thereto.

Unless otherwise defined, all terms used herein including technical or scientific terms have the same meaning as commonly understood by one of ordinary skill in the art to which examples belong and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

As noted above, a device that implements a machine learning model, e.g., a neural network, typically requires a large amount of computational power to be able to handle complex input data, and as a learning capacity of the machine learning model increases. For example, as a learning capacity of a neural network increases, the connections within the neural network typically become more complex.

In addition, overfitting may occur when too much training data is used to train an example neural network. Also, it is found herein that as machine learning models becomes more complex, and an amount of memory allocated increases accordingly, miniaturization and commercialization of the device that implements the same may become more difficult.

In one or more example, landmark coordinates of a face image may be predicted for N-coordinate predictions in which N denotes a total number of face landmarks. For example, there may be a total of six face landmarks, such as corners of eyes and corners of mouth, as well as common 68-point and 98-point landmarks, noting that examples are not limited to these example numbers of landmarks. A self-attention layer or model may be used to learn structural dependencies between landmark coordinates and, with the self-attention layer or model outputting corresponding feature vectors for each landmark. Subsequently, a deformable attention layer or model based on image features may be used to focus on a small number of image features, i.e., less than all image features or without retrieving all image features, sampled around a reference point (which may lead to a reduction in a convergence time of a model, so convergence may occur more quickly). Here, information (i.e., a reference point) associated with initially predicted landmark coordinates or a prediction of a previous decoder model, e.g., which may include its own self-attention model and deformable attention model, may be used as a guide to extract a more or most relevant image feature around landmarks and regressively refine the coordinates of the landmarks. In addition, in an example, "n" features may be extracted from a last layer of a backbone network in a fully connected manner and used as an initial query matrix, instead of (e.g., without) using a randomly initialized query matrix. Such an approach may increase a convergence speed of a model and further enhance an accuracy of a prediction of landmark coordinates in a face image.

FIG. 1 illustrates an example network configuration and method with face landmark coordinate predictions.

In comparison to a typical deformable DETR (Detection Transformer) model, which requires use of a landmark template not related to any particular input image or features of the same, and merely uses random numbers for an initial query embedding, various examples herein extract meaningful features based on an image feature map, e.g., using a series of feature extractors and a fully connected layer, and use the extracted features as initial query embedding for provision to a decoder. In an example, a total number of queries may be set to a total number of landmarks used for prediction, and initial query embedding based on the extracted features may provide an approximate reference point position associated with an image rather than the standard landmark template, which is not related to or dependent on the image. References herein to a layer may be understood to also refer to plural layers or respective models, or a network of one or more such layers or models, as machine learning layer(s), model(s), and network(s). For example, a respectively referenced self-attention layer, fully connected layer, deformable attention layer, and offset prediction layer (or multilayer perceptron (MLP)), may each respectively refer to one or more layers or models of a referenced decoder layer, model, or network. For example, the self-attention layer may also be referred to as a self-attention model, or a self-attention portion of a decoder network, just as the fully connected layer, deformable attention layer, and offset prediction layer (or multilayer perceptron (MLP)) may also be respectively referred to as corresponding models or portions of the decoder layer, model, or network. In an example, such layer(s), model(s), or network(s) may be respective neural network layer(s), model(s), and network(s). Similarly, a deformable attention layer may be referred to as a deformable attention model, or a deformable attention portion of a decoder network or model. Here, while these examples are presented, examples are not limited to the same and alternate examples also exist.

In addition, in further comparison to the typical deformable DETR model, examples herein may not include an encoder layer, but rather, may merely utilize a convolutional layer network and a fully connected layer, which may reduce a total number of decoder layers (for example, the typical deformable DETR model requires six decoder layers, while one or more examples are provided herein where no more than three decoder layers or less may be included, while examples are also not limited to the same. Also, in an example, only an L1 norm loss function (an absolute value representing a difference between a predicted value and an actual value) may be used for model training, distinguished from such a typical deformable DETR model, examples model sizes herein may be reduced, and computational costs may be saved.

Referring to FIG. 1, an initial query matrix $Q_{init}$ may be generated, or obtained based on, by fully connecting a last-stage feature map from the illustrated multi-stage feature map that includes features generated by different levels or stages of the illustrated convolution operations. For example, the different convolutional layers may extract features of different receptive fields, such as where a final level or stage of the convolutional network generates features of a large receptive field compared to the smaller receptive field of the first or initial level or stage of the convolutional network, as non-limiting examples. As another example, the different convolutional layers may extract features between local and global fields, such as where a final level or stage of the convolutional network generates global features compared to the local features extracted by the first or initial level or stage of the convolutional network, as non-limiting examples. A memory feature matrix may be generated, or obtained based on, by flattening and connecting the multi-stage feature map. The memory feature matrix and the initial query matrix may be input to an initial decoder layer, to predict initial-landmark coordinates of the face image through the decoder layer. The results of this initial decoder layer may then be used to generate features for the input image to be provided to a next decoder layer, and used to generate updated coordinate or position information to be provided to the next decoder layer.

Figure 2:
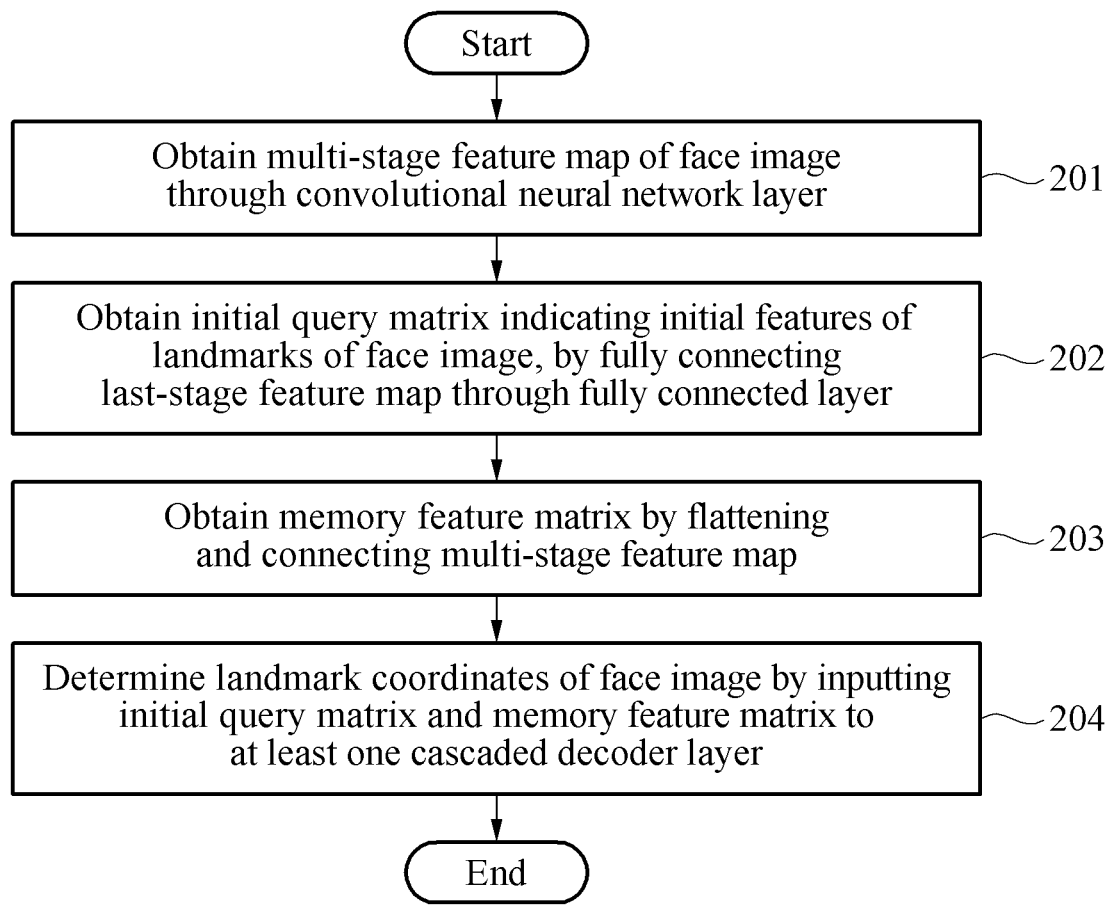
FIG. 2 is a flowchart illustrating an example method with face landmark coordinate predictions.

FIG. 2 is a flowchart illustrating an example method with face landmark coordinate predictions.

Referring to FIG. 2, in operation 201, a multi-stage feature map (e.g., a four-stage feature map of FIG. 1) of the face image may be obtained through a convolutional network, e.g., a convolutional neural network layer may include four (staged) convolutional layers. The extracted multi-stage feature map may represent pyramid features, where a lower-stage feature map represents local features of the face image, and a higher-stage feature map represents global features of the face image.

This convolutional network may be referred to as a backbone network that generates pyramid feature of a face image. In an example, ResNet18 may be used as the backbone network, however, the examples are not limited to ResNet18. For example, with an example ResNet18 network, given an input image may have a size of "256×256×3," respective feature maps, generated by the first convolutional layer (stage) through the final convolutional layer (stage), may have convolutional resultant sizes of "64×64×64," 32×32×128," "16×16×256," and "8×8×512." Each stage may also include one or more convolutional layers, for example an initial convolutional layer (stage) may include five 3×3 convolutional layers with 64 channels, the next stage may include four 3×3 convolutional layers with 128 channels, followed by the next stage that may include four 3×3 convolutional layers with 256 channels, and the final stage that may include four 3×3 convolutional layers with 512 channels. The illustrated convolutional network is further representative of a fully connected layer subsequent to the final stage, such as discussed below in operation 202.

In operation 202, an initial query matrix $Q_{init}$ may be obtained by fully connecting the last-stage feature map in the multi-stage feature map through a fully connected layer.

Here, the initial query matrix $Q_{init}$ may represent initial features (initially determined features) of landmarks of the face image, and a total number of elements of the initial query matrix $Q_{init}$ may be equal to a total number of landmarks that will be predicted from the face image. The initial query matrix $Q_{init}$ may be obtained in accordance with Equation 1 shown below.

$$Q_{init}=FC(F) \qquad \text{Equation 1:}$$

In Equation 1, F denotes a feature map from a last layer of a backbone network (e.g., the 8×8×512 final feature map), and a size thereof may be expressed as "(H×W)×C," in which H and W denote a spatial width and height of the feature map and C denotes a feature dimension of the feature map. The number of dimensions may also be referred to as the number of channels of this final feature map, e.g., where each channel represents a different feature that is extracted. FC denotes a fully connected layer, which may map a spatial scale of each feature channel "H×W" to a vector of size "N." Said another way, the initial query matrix $Q_{init}$ may represent features extracted from the spatial dimension of image features, e.g., different from a generation of a query matrix after a global average pooling is performed on memory features.

The input query matrix $Q_{init}$ may thus have a size of "N×C" in which N denotes the total number of landmarks in the face image and C denotes a feature dimension (e.g., the total number of channels). In an example, the query matrix $Q_{init}$, may be considered a learnable matrix, and may represent extracted landmark-related features that can be used by an initial decoder layer to transform the landmark-related features to coordinates. In post-initial decoder layer operations, the query matrix Q input to the post-initial decoder may represent updated landmark-related features generated by the previous decoder layer, which may be used to generate more fine or accurate landmark coordinates by the post-initial decoder. In an example, each of the decoders may output predicted landmark coordinates, e.g., rather than only outputting the predicted landmark coordinates by the final decoder layer. Still further, in one or more examples, an increasing in the number of decoders may increase accuracy or performance, while previous approaches' accuracies and performances become reduced as the number of decoders are increased.

In operation 203, the memory feature matrix may be obtained by flattening and connecting the multi-stage feature map.

In one example, the configuration of the feature extraction and use of such information for landmark coordinate prediction may correspond to an encoder-decoder framework. For example, the backbone network may be used as an encoder to extract pyramid features from an input image. As demonstrated above, the pyramid features may have different numbers of output channels, e.g., with the ResNet18 example, the respectively different numbers of channels output by each incremental stage of the convolutional network may be 64, 128, 256, and 512 channels, respectively. Thus, the generation of the memory feature matrix may include generating feature maps with the same total number of output channels by respectively applying 1×1 convolution to the feature maps generated by the different convolutional layer stages, thereby projecting the different features to a same number of channels. Subsequently, the resulting feature maps with the same number of output channels may be flattened and connected to obtain a memory feature matrix M, e.g., where M may indicate a length of the flattened features.

In operation 204, landmark coordinates of the face image may be determined by inputting the memory feature matrix and the initial query matrix to at least one decoder layer that is cascaded with another decoder layer. For example, the decoder layers provide a cascaded regression framework where the coordinate offsets are predicted by each decoder layer, and where the landmark coordinates are refined iteratively during the decoder processes.

According to examples, decoder layers may have the same structure, except that input matrices and output matrices of the decoder layers are different.

For example, each decoder layer may include a self-attention layer, a deformable attention layer, and a landmark coordinate prediction layer, where the self-attention layer, the deformable attention layer, and the landmark coordinate prediction layer may be cascaded. As noted above, while references may be made to a decoder 'layer', such a 'layer' reference is to multiple layers or models included therein, and thus is used as a term of convenience for explanation. For example, such a decoder layer may also be referred to as a decoder network, or a decoder neural network. In an example, the decoder layer may be a transformer model.

For example, an operation of determining landmark coordinates of the face image may include inputting query, key, and value information to the self-attention layer, where the self-attention layer is a QKV transformer. The deformable attention layer of the decoder layer may also be a QKV transformer.

The initial query matrix $Q_{init}$ may be input as a 'value' to the self-attention layer of an initial decoder layer. The position information (e.g., P) may be embedded with the initial query $Q_{init}$, to generate the initial query matrix with embedded position information (e.g., $Q_{init}$ P). The initial query matrix with embedded position information may be respectively input as a query and a key to the self-attention layer.

An output information or output matrix of a self-attention layer of a current decoder layer, i.e., other than the first decoder layer, the memory feature matrix, and landmark coordinates predicted by a previous decoder layer may each be input to a deformable attention layer of the current decoder layer, to obtain an output information or matrix of the deformable attention layer. Here, the output matrix of the self-attention layer and the memory feature matrix may be respective query and value inputs of the deformable attention layer. For the first decoder layer, such landmark coordinates predicted by a previous decoder layer and input to a deformable attention layer of the first decoder layer may be merely initial landmark coordinates obtained based on the initial query matrix.

For example, initial landmark coordinates may be obtained by performing a fully connected operation on the initial query matrix.

The output matrix of the deformable attention layer of the current decoder layer (or after an example normalization and fully connected layer subsequent to the deformable attention layer) may be input to a landmark coordinate prediction layer of the current decoder layer, to obtain landmark coordinates of a face image predicted by the current decoder layer. Landmark coordinates of the face image predicted by a last decoder layer (i.e., the decoder layer last in the cascade of decoder layers) may be landmark coordinates of a final face image.

The output matrix $Q^D$ of the deformable attention layer (or after the example normalization and fully connected layer subsequent to the deformable attention layer) of the current decoder layer may then be used as a new input for the self-attention layer of the next decoder layer in the cascade of decoder layers, e.g., as the value input to the self-attention layer of the next decoder layer. Similar to above, position information may be embedded in this new input query matrix, and the new input query matrix with embedded position information may be input to the self-attention layer of the next decoder layer as the query and key inputs of the self-attention layer.

Figure 3:
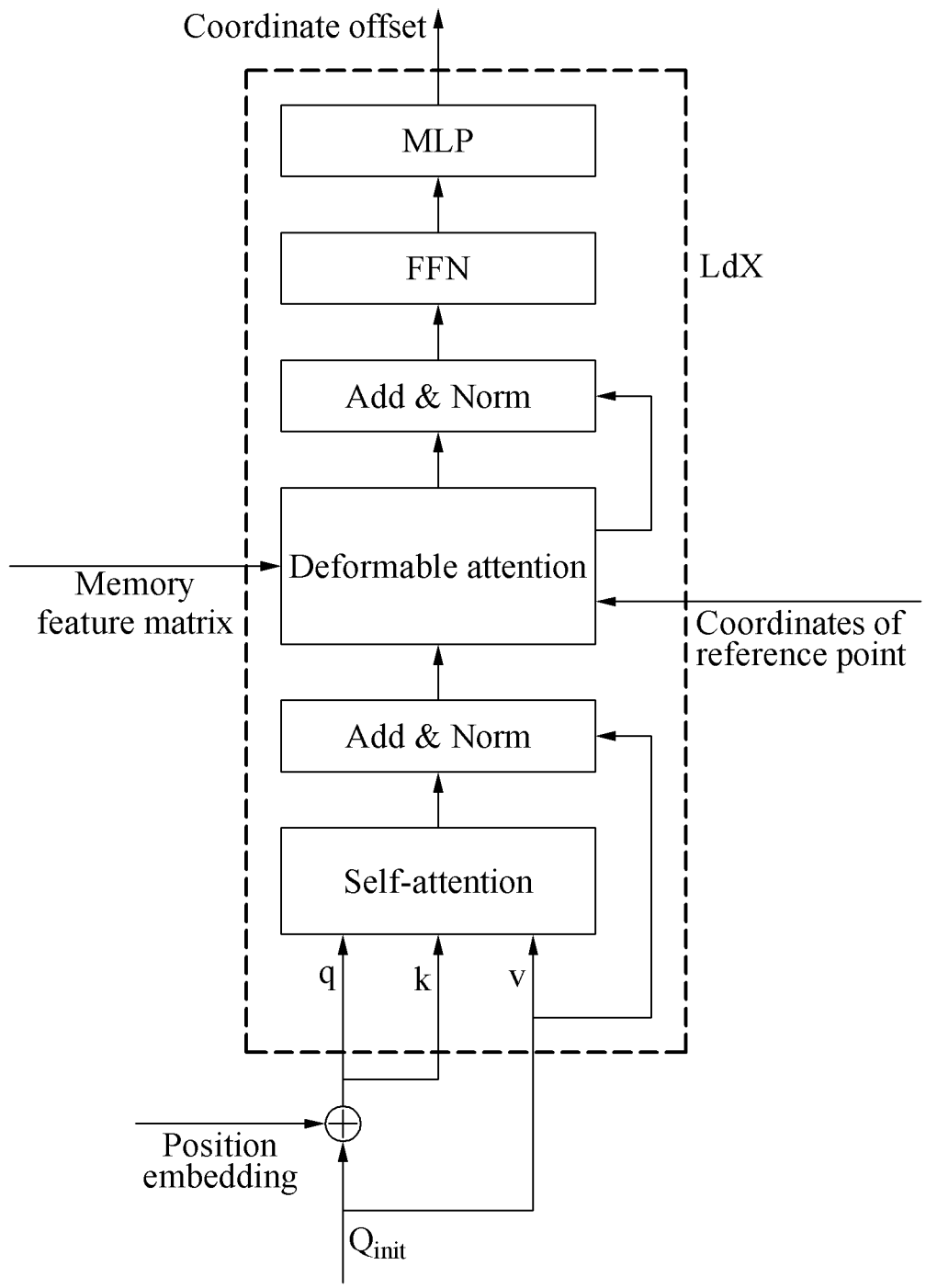
FIG. 3 illustrates an example configuration of a decoder layer.

FIG. 3 illustrates an example configuration of a decoder layer, and other decoder layers may have the same structure.

Referring to FIG. 3, each decoder layer may include a self-attention layer and a deformable attention layer. The self-attention layer of each decoder layer may include a self-attention layer and a residual summation normalization layer Add & Norm layer. Alternatively, the residual summation normalization layer Add & Norm layer may be separate from the self-attention layer.

A query and a key inputs of the self-attention layer of the first decoder layer may be $Q_{init}$ with embedded position information, and a value input of the self-attention layer may be $Q_{init}$. Each of the query, key, and value inputs may be matrix inputs. As noted above, the query, key, and value inputs of a self-attention layer of another or next decoder layer may be, or be based on, the output information or matrix of the deformable attention layer of the first decoder layer. The output information or matrix of the deformable attention layer may be embedded with position information and input as the query and key of the self-attention layer of the other or next decoder layer, and the output information or matrix of the deformable attention layer of the first decoder layer may be input as the value input of the self-attention layer of the other or next decoder layer.

As noted, the query, key, and value inputs of a self-attention layer of another or next decoder layer may be based on the output information or matrix of the deformable attention layer of the previous decoder layer. For example, the deformable attention layer of each decoder layer may include a deformable attention layer, a residual summation and normalization layer Add & Norm, and a feedforward neural network (FFN) layer. Alternatively, the residual summation normalization layer Add & Norm layer and the FFN layer may be separate layers from the self-attention layer.

As noted above, the output, e.g., an output matrix, of the self-attention layer may be used as a query input to the deformable attention layer, and the memory feature matrix may be a value input to the deformable attention layer.

As the self-attention layer may use a query matrix Q (e.g., $Q_{init}$ and $Q_{init}$+position embedding P for the first decoder layer) as inputs, structural dependencies between landmarks may be learned by the decoder layers. Corresponding information may be independent of an image, and gestures, facial expressions, and the like may be captured at landmark positions, which may prove to be important for landmark positioning. The self-attention layer may use the Q with position embeddings P (Q+P) as the query and key inputs to the self-attention layer, and use Q as the value input to the self-attention layer. For example, the initial query matrix $Q_{init}$+P may be used as the query and key to the self-attention layer of the first decoder layer subsequent to the initial decoder layer, while $Q_{init}$ may be used as the value input of the self-attention layer. For the next (and remaining decoder layers), the input value to a corresponding self-attention layer will be the output $Q^D$ of the deformable attention layer (e.g., where the deformable attention layer further includes an Add & Norm layer of FIG. 3) of the previous decoder layer, and the output $Q^D$ with embedded position information may be used as the query and key inputs to this self-attention layer. Here, the position information P embedded into the $Qi_{init}$ or $Q^D$ and input to the self-attention layers may be learnable position embedding.

With respect to the operation of the self-attention layer, an output $Q^E$ of the self-attention layer (or similarly referred to input $Q^E$ to the deformable attention layer) may be obtained in accordance with Equation 2 shown below.

$$q_i^E = \sum_{j=1}^{N} \alpha_{ij} q_j, i = 1, 2, \ldots N \quad \text{Equation 2}$$

In Equation 2, $q_i^E$ denotes an i-th row vector of an output matrix of the self-attention layer (e.g., also representing the i-th row vector of a query input to the deformable attention layer), $\alpha_{ij}$ denotes an attention weight obtained by normalizing a dot product of an i-th row vector of a query input (as a matrix) to the self-attention layer and a j-th row vector of a key input (as a matrix) to the self-attention layer, $q_j$ denotes a j-th row vector of a value input (as a matrix) to the self-attention layer. As noted above, the value input may be the initial query matrix $Q_{init}$ or the $Q^D$ output matrix of the deformable attention layer of the previous decoder layer, and the query and key inputs to the self-attention layer would be the corresponding position embedded $Q_{init}$ or $Q^D$ matrices. Further, N denotes a total number of landmarks to be predicted.

For example, with the example QKV transformers (where Q refers to the query input) of the self-attention layer and deformable attention layer, when the query Q, key K, and value V inputs (as respective matrices) have a size of "N×C", $\alpha = \text{Softmax}(Q \times K^T / \sqrt{d_k})$ may be satisfied. In addition, $\alpha_{ij}$ denotes a value of an (i, j)-th element of an L×L matrix $\alpha$, and $d_k$ denotes a dimension of a row vector of a key matrix.

A Softmax operation may be performed in accordance with Equation 3 below.

$$\text{Softmax}(x_i) = \frac{e^{x_i}}{\sum_j e^{x_j}} \quad \text{Equation 3}$$

Here, the Softmax operation may normalize all input values to (0, 1) and allow a sum of all inputs to be "1", for example. In Equation 3, a denominator represents a sum of all input indices, and a numerator represents an exponent of a specific value.

A deformable attention layer of each decoder layer may generate updated features $Q^D$ of/for the landmarks. For example, output information or matrix $Q^D$ of a deformable attention layer (e.g., when the deformable attention layer includes the Add & Norm and FFN layers of FIG. 3, or the output after the respective operations of the Add & Norm and FFN layers), is based on the output $Q^E$ information or matrix of the correspondingly cascaded self-attention layer being the query input to the deformable attention layer, the memory feature information or matrix being a value input to the deformable attention layer, and updated landmark coordinate information or matrices, as the landmark coordinates predicted by a previous decoder layer, being a key input to the deformable attention layer. For a decoder layer immediately after the first or initial decoder layer, the updated landmark coordinate information or matrix input as the key input to the deformable attention layer may alternatively be initial landmark coordinate matrices for the first decoder layer. For example, such initial landmark coordinate matrices may be generated by fully connecting the initial query matrix $Q_{init}$. Landmark coordinates and landmark coordinate matrices described herein may represent the same information.

For example, the output matrix $Q^D$ of the deformable attention layer may be obtained in accordance with the below Equation 4 and following description.

$$f_i = \sum_{k=1}^{K} \beta_{ik} x_{ik}, i = 1, \ldots, N \qquad \text{Equation 4}$$

Thus, updated feature $f_i$ (of the output matrix $Q^D$) of an i-th landmark may be generated. Here, coordinates of the i-th landmark may be the predicted coordinates generated by a previous decoder layer. In Equation 4, $\beta_{ik}$ denotes an attention weight obtained by performing a fully connected operation and a Softmax operation on information $Q^E$ output (e.g., as a matrix) by the self-attention layer, which also refers to the information $Q^E$ input (e.g., as a matrix) to the deformable attention layer, $x_{ik}$ denotes a feature corresponding to coordinates of a k-th reference point in the aforementioned memory feature matrix, and K denotes a preset value. K may denote the total number of samplings among the memory feature matrix to consider, e.g., instead of all features in the memory feature matrix. A position offset between the coordinates of the k-th reference point and i-th landmark coordinates in landmark coordinates predicted by a previous decoder layer may be obtained by performing a fully connected operation on the query input (i.e., $Q^E$) to the deformable attention layer. For example, the coordinates of the k-th reference point may be obtained by adding the position offset to the i-th landmark coordinates, and accordingly a parameter matrix of the fully concatenated operation may be associated with K.

Specifically, $\beta_{ik}$ may be obtained in accordance with Equation 5 shown below.

$$\beta_i = \text{Softmax}(W_K QE_i) \qquad \text{Equation 5:}$$

$\beta_{ik}$ denotes a k-th element of $\beta_i$. Here, $QE_i$ denotes an i-th C-dimensional row vector of the query input (as a matrix) of the deformable attention layer, $W_K$, which is a matrix of K×C, denotes a fully connected operation parameter matrix on which a fully connected operation is performed for $QE_i$, and may be a learnable matrix. As described above, a dot product of $W_K$ and $QE_i$ may be obtained and then normalized through the Softmax operation, so that an attention weight $\beta_{ik}$ may be obtained.

$x_{ik}$ is an image feature sampled from M. For example, $x_{ik}$ denotes a feature obtained by adding a position offset to a coordinate index of a value matrix M (e.g., a feature corresponding to corresponding coordinates in the value input M is determined according to the obtained coordinates) and an element $p_i$ (i.e., i-th landmark coordinates predicted by a previous decoder) of a landmark coordinate matrix predicted by a previous decoder layer or the initial landmark coordinates (for the first decoder layer). Since k has a value of "1" through "K", "K" features may be indexed from M for each landmark.

Here, a position offset $\Delta p_{ik}$ may be a relative offset between a position of a K-th reference point among "K" reference points obtained by a full connection through the query input (as a matrix) (coordinates of the K-th reference point are obtained by adding the position offset $\Delta p_{ik}$ to coordinates of an i-th reference point) and a position of an i-th landmark. The position offset may be obtained in accordance with Equation 6 shown below.

$$\Delta p_i = W'_K QE_i$$

$\Delta p_{ik}$ denotes a k-th element of $\Delta p_i$, where k=1, . . . , and K, $QE_i$ denotes an i-th C-dimensional row vector of the query input matrix, $W'_K$ denotes a matrix of "2K×C," $QE_i$ denotes a fully connected operation parameter matrix on which a fully connected operation is performed and may be a learnable matrix, and "2" indicates that each position includes two values, that is, an abscissa and ordinate.

K denotes a selected total number of reference points required for each landmark, and may be preset.

In an example, for explanatory purposes, a third element in coordinates predicted by the above decoder layer will be described as an example, and K may be set to "4."

The third element may be coordinates $p_3$ of a third landmark predicted by a previous layer decoder. Rather, if a current decoder layer is the first decoder layer, $p_3$ may be initial coordinates of the third landmark obtained by performing a full connection on the initial query matrix $Q_{init}$. Based on the preset K, $\Delta p_3$ may be obtained by performing a full connection on $QE_i$, and $\Delta p_3$ may include four elements, e.g., $\Delta p_{31}$, $\Delta p_{32}$, $\Delta p_{33}$, and $\Delta p_{34}$. Coordinates of a first reference point corresponding to $x_{31}$ may be obtained through $p_3$ $\Delta p_{31}$, and element $x_{31}$ of a memory feature matrix may be determined based on the coordinates. Similarly, a second reference point, a third reference point, and a fourth reference point corresponding to $x_{32}$, $x_{33}$, and $x_{34}$ may be obtained through $p_3$ $\Delta p_{32}$, $p_3+\Delta p_{33}$, and $p_3$ $\Delta p_{34}$, and accordingly elements $x_{32}$, $x_{33}$, and $x_{i34}$ in memory features may be determined. Finally, $f_3$, that is, updated features of the third landmark may be obtained, and updated features of other landmarks may also be obtained in the same way. In other words, the output information or matrix $Q^D$ of the deformable attention layer may represent updated features of landmarks in the face image.

As described above, the deformable attention layer may use $Q^E$ as a query input (e.g., as a matrix) and use a memory feature information (e.g., as a matrix) M as a value input, and only a small group (e.g., features of "K" points near an i-th landmark may be used when a feature of the i-th landmark is calculated) obtained by sampling M at a reference point (i.e., an initial landmark coordinate matrix or a landmark coordinate matrix predicted by a previous decoder layer) may be focused.

For example, when an output matrix $Q^D$ of the deformable layer is obtained, an offset $y_O$ of landmark coordinates predicted by the current decoder layer may be obtained with respect to the landmark coordinates predicted by the previous decoder layer through the landmark coordinate prediction layer of each decoder layer. In other words, $Q^D$ may be used as an input of a sensing layer, and an output may be $y_O$.

For example, a three-layer fully connected network with a ReLU activation function may be used for this sensing layer. The first two layers may include a linear full connection and a ReLU activation function, the last layer may directly output coordinate deviation or offset information through a full connection, e.g., without a ReLU activation function. For example, a multi-layer perceptron (MLP) of FIG. 3 may be provided. The $Q^D$ may be used as the input to the MLP and coordinate-related information may be output. The ReLU activation function may be expressed as shown in Equation 7 below.

$$\text{ReLU}(x) = \max(0, x) \qquad \text{Equation 7:}$$

After obtaining $y_O$, landmark coordinates predicted by the current decoder layer may be obtained in accordance with the below Equation 8.

$$y = \sigma(y_O + \sigma^{-1}(y_R))$$

In Equation 8, y denotes landmark coordinates predicted by a current decoder layer, $y_R$ denotes initial landmark coordinates (for the first decoder layer) or landmark coordinates predicted by a previous decoder layer, and $y_O$ denotes an output of a perceptron layer of a landmark coordinate prediction layer of the current decoder layer and indicates an offset of y with respect to $y_R$. As noted, the input of the multi-layer perceptron layer may be the output information or matrix $Q^D$ of the deformable attention layer, e.g., after the Add & Norm and FFN operations subsequent to the deformable attention layer when the Add & Norm and FFN layers are separate from the deformable attention layer.

The σ function of Equation 8 may be expressed as shown in Equation 9 below, for example.

$$\sigma(x) = \frac{1}{1 + e^{-x}} \qquad \text{Equation 9}$$

Finally, landmark coordinates predicted by a last decoder layer may be determined as final predicted landmark coordinates.

In an example, for explanatory purposes, a landmark prediction model may have three decoder layers.

For a first decoder layer, a value input of a corresponding self-attention layer may be $Q_{init}$, while query and key inputs of the self-attention layer may be $Q_{init}$ having been embedded with position information. The query, key, and value inputs may be in matrix form.

In an example of a second decoder layer a value input of a corresponding self-attention layer may be $Q^D$ of the first decoder layer, i.e., the updated features output from the deformable attention layer of the first decoder layer, or the result of the same being processed through the Add & Norm and FFN layers subsequent to the deformable attention layer of the first decoder layer. Position information may be embedded with the $Q^D$ matrix and input as the query and key inputs of the of the self-attention layer of the second decoder layer. $Q^D$ of the second decoder layer represent updated features.

In an example of a third decoder layer, a value input of a corresponding self-attention layer may be the $Q^D$ matrix of the second decoder layer, and $Q^D$ of the second decoder layer with embedded position information may be the query and key inputs to the self-attention layer.

Landmark coordinates predicted by the first decoder layer may be generated from an initial landmark coordinate matrix. Landmark coordinates predicted by the second decoder layer may use the landmark coordinates predicted by the first decoder layer, as coordinates updated by the first decoder layer with respect to the initial landmark coordinates. Landmark coordinates predicted by the third decoder layer may use the landmark coordinates predicted by the second decoder layer, as coordinates updated by the second decoder layer with respect to the landmark coordinates predicted by the first decoder layer. While this three decoder layer model is provided, such a description is for explanatory purposes, and examples are not limited thereto. For example, there may be two decoder layer models and decoder models with more than three decoder layers.

In an example, while the backbone network may be trained through typical approaches, for the desired feature extractions, the decoder layers may be trained using an L1 norm loss function (an absolute value representing a difference between a predicted value and an actual value) between predicted landmark coordinates of a training image sample and actual landmark coordinates of the training image sample. A regression loss function $L_{reg}$ used for training may be expressed as shown in Equation 10 below.

$$L_{reg} = \sum_{l=0}^{L_d} \|y_l - \hat{y}\| \qquad \text{Equation 10}$$

In Equation 10, $y_l$ denotes landmark coordinates of a training image sample predicted by each decoder layer, $\hat{y}$ denotes actual landmark coordinates of the training image sample, $L_d$ denotes a total number of decoder layers, and l denotes an index of a decoder layer.

Accordingly, in an example, end-to-end training of the entire prediction model may be performed.

Figure 4:
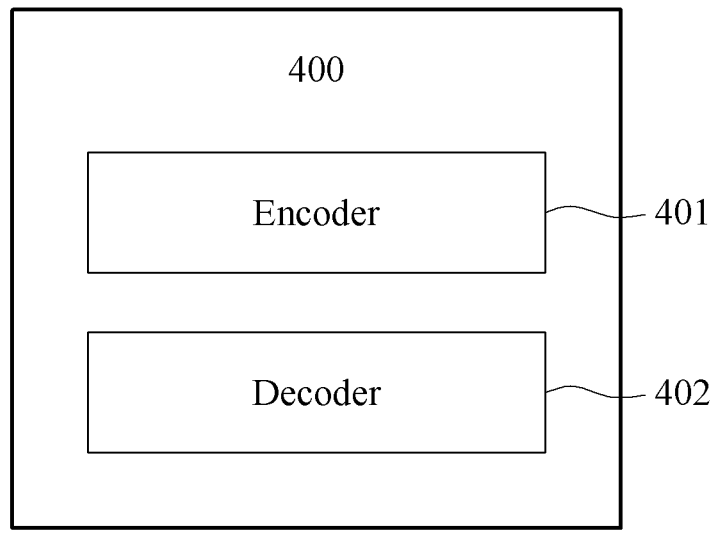
FIG. 4 is a block diagram illustrating an example apparatus with landmark coordinate predictions.

FIG. 4 is a block diagram illustrating an example apparatus with landmark coordinate predictions.

Referring to FIG. 4, an apparatus 400 for predicting a face landmark may include an encoder 401 and a decoder 402. Examples exist with the apparatus 400 including further components and components included in the apparatus 400 may be variously divided or combined. Each of the encoder 401 and decoder 402 are representative of a processor or a processor and memory. The apparatus 400 may also be representative of included memory that may be accessed from/to the encoder 401 and decoder 402. The encoder 401 and decoder 402 may also be representative of a same processor or same processor and a memory. Herein, references to a processor also include references to two or more processors, and references to a memory also include references to two or more memories.

For example, the encoder 401 may be configured to generate a multi-stage feature map of a face image through a convolutional network, generate an initial query matrix by fully connecting a last-stage feature map in the multi-stage feature map through a fully connected layer, and generate a memory feature matrix by flattening and connecting the multi-stage feature map. In this example, the initial query matrix may represent initial features of landmarks of the face image, and a total number of elements in the initial query matrix may be equal to a total number of landmarks in the face image.

For example, the encoder may be implemented with plural convolutional layers, one or more fully connected layers, and one or more flattening-and-connection layers. The convolutional layers may be configured to extract a multi-stage feature map of a face image through the respective extractions of the convolutional layers. The convolution layers may be arranged to extract local features in first convolutional layers and extract global features in final convolutional layers, as well as incrementally extracting local to global features through the respective convolutional layers. The different convolutional layer may have different receptive fields, e.g., with incrementally increasing receptive fields. The fully connected layer may be configured to obtain an initial query matrix by fully connecting a last-stage feature map (e.g., of a final convolutional layer) of the multi-stage feature map, and the flattening-and-connection layer may be configured to obtain a memory feature matrix by flattening and connecting features extracted from different stages of the convolutional layers to generate the multi-stage feature map. For example, the multi-stage feature map may include a feature extracted by a first convolutional layer, e.g., as a local feature, and may also include a feature extracted by one or more subsequent layers or a final convolutional layer, as global features. In an example, the multi-stage feature map includes pyramid features, which may have different down-sampling ratios, such as with down-sampling ratios of 4, 8, 16, 32, relative to the input image. A 1×1 convolution may be respectively applied to the different convolutional layer extracted features to project the different stage features into the same number of channels, for example. Resulting projected features may then be flattened and concatenated together. Thus, differently from the generating of the initial query matrix by fully connecting feature maps of a last-stage feature map in the multi-stage feature map, the multi-stage feature map includes features based on feature maps of multiple stages of convolutional layers. Accordingly, the memory features resulting from the flattening and connecting of the multi-stage feature map still represent features extracted by different stages of the staged convolutional layers.

In an example, the decoder 402 may include two or more decoder layers that are cascaded, and respectively configured to iteratively determine landmark coordinates of the face image based on the memory feature matrix and the initial query matrix received from the encoder 401.

For example, each decoder layer may each include a cascade of a self-attention layer, a deformable attention layer, and a landmark coordinate prediction layer.

For example, a self-attention layer of a first decoder layer may be configured to obtain an output matrix based on an initial query matrix in which received position information is embedded and the initial query matrix. In this example, the initial query matrix in which the received position information is embedded may be used for both the query and key inputs of the self-attention layer, and the initial query matrix may be used as the value input of the self-attention layer.

A self-attention layer of each of the decoder layers other than the first decoder layer may be configured to obtain an output matrix of a deformable attention layer of a current decoder layer, based on an output matrix of a deformable attention layer that is cascaded within the previous decoder, and an output matrix of the deformable attention layer of the previous decoder layer with embedded position information. Here, the output matrix of the deformable attention layer of the previous decoder layer may be used as the value input of the self-attention layer, and the output matrix of the deformable attention layer of the previous decoder layer with the embedded position information may be used as the query and key inputs of the deformable attention layer.

A deformable attention layer of each decoder layer may be configured to generate an output matrix based on an output matrix of a self-attention layer of the current decoder layer, the memory feature matrix, and landmark coordinates predicted by a previous decoder layer that is cascaded. Here, the output matrix of the self-attention layer of the current decoder layer and the memory feature matrix may be used as the query and value inputs of the deformable attention layer of the current decoder layer, and the landmark coordinates predicted by the previous decoder layer of the decoder layers, other than the first decoder layer, may be used as the value input of the deformable attention layer. For the first decoder layer, the value input to the deformable attention layer may be initial landmark coordinates obtained based on the initial query matrix.

Each landmark coordinate prediction layer may be configured to obtain landmark coordinates of the face image predicted by each decoder layer, based on the output matrix of the deformable attention layer of the current decoder layer and based on the landmark coordinates predicted by the previous decoder layer. Here, landmark coordinates of the face image predicted by a last decoder layer may be landmark coordinates of a final face image.

In an example, the encoder 401 or the decoder 402 apparatus 400 are further representative of including a fully connected layer configured to perform a fully connected operation on an initial query matrix to obtain initial coordinates of landmarks of the face image. Either of the encoder 401 and the decoder 402 are respectively representative of the described layers and corresponding operations described above.

Figure 5:
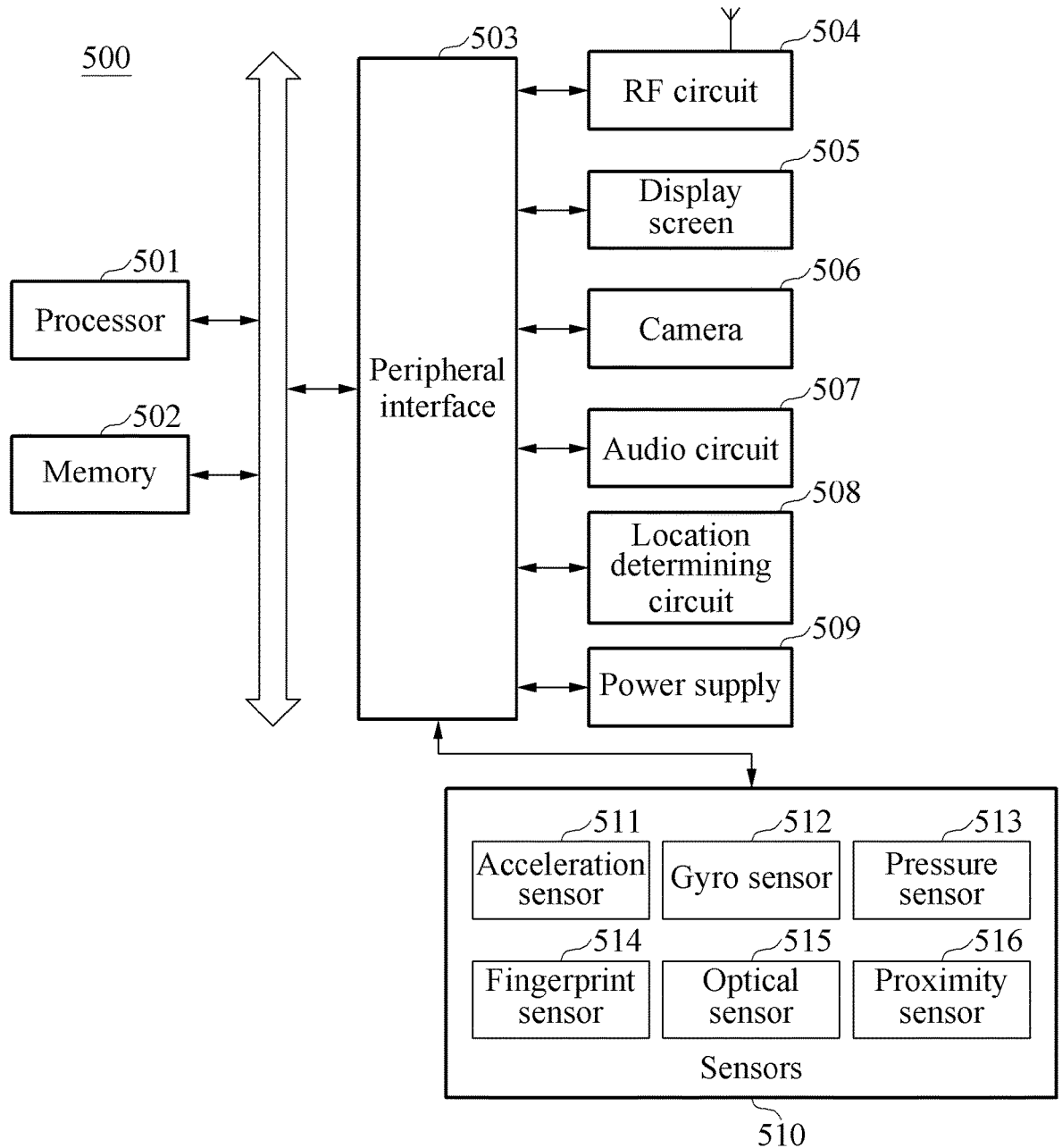
FIG. 5 is a block diagram illustrating an example electronic apparatus with landmark coordinate prediction.

FIG. 5 is a block diagram illustrating an electronic device with landmark coordinate predictions.

In general, an electronic device 500 includes a processor 501 and a memory 502.

The processor 501 may include one or more processing cores, and may be, for example, a 4-core processor or an 8-core processor. The processor 501 may be implemented in at least one hardware form of a digital signal processor (DSP), a field-programmable gate array (FPGA), and a programmable logic array (PLA). The processor 501 may also include a main processor and a coprocessor. The main processor may be a processor configured to process data in an awake state and may also be referred to as a "central processing unit (CPU)." The coprocessor may be a low power consumption processor configured to process data in a standby state. In some examples, the processor 501 may be integrated with a graphics processing unit (GPU) used to render and draw content that needs to be displayed on a display screen. In some examples, the processor 501 may further include an artificial intelligence (AI) processor (e.g., a Neural Processor Unit (NPU)) used to process the above computing operation related to machine learning.

The memory 502 may include one or more non-transient computer-readable storage media. The memory 502 may further include a high-speed random access memory, and a non-volatile memory such as one or more magnetic disk storage devices and flash memory devices. In some examples, a non-transitory computer-readable storage medium of the memory 502 may be configured to store at least one instruction that is executed by the processor 501 to implement a scheme of training an echo cancellation model and/or eliminating an echo delay according to the present disclosure.

In some examples, the electronic device 500 may further include a peripheral interface 503 and at least one peripheral device. The processor 501, the memory 502, and the peripheral interface 503 may be connected by a bus or a signal line. Each peripheral device may be connected to the peripheral interface 503 via a bus, a signal line, or a circuit board. Specifically, the peripheral device may include a radio frequency (RF) circuit 504, a display screen 505, a camera 506, an audio circuit 507, a location determining circuit 508, and a power supply 509.

The peripheral interface 503 may be used to connect at least one peripheral device related to input/output (I/O) to the processor 501 and the memory 502. In an example, the processor 501, the memory 502, and the peripheral interface 503 may be integrated into the same chip or circuit board. In another example, at least one of the processor 501, the memory 502, or the peripheral interface 503 may be implemented on separate chips or circuit boards, and there is no limitation thereto.

The RF circuit 504 may be used to receive and transmit an RF signal, and may also be referred to as an "electromagnetic signal." The RF circuit 504 may communicate with a communication network and other communication devices using electromagnetic signals. The RF circuit 504 may convert an electric signal into an electromagnetic signal for transmission, or convert a received electromagnetic signal into an electric signal. Optionally, the RF circuit 504 may include an antenna system, an RF transceiver, one or more amplifiers, a tuner, an oscillator, a digital signal processor, a codec chip set, a subscriber identity card, and the like. The RF circuit 504 may communicate with other terminals using at least one wireless communication protocol. The wireless communication protocol may include, but is not limited to, for example, a metropolitan area network, different generations of mobile communication networks (2G, 3G, 4G, and 5G), a wireless local area network, and/or a wireless fidelity (Wi-Fi) network. In some examples, the RF circuit 504 may also include a circuit related to near field communication (NFC). However, the examples are not limited thereto.

The display screen 505 may be used to display a user interface (UI). The UI may include a graphic, a text, an icon, a video, and any combination thereof. When the display screen 505 is a touch screen, the display screen 505 may also have an ability to collect a touch signal on or above a surface of the display screen 505. The touch signal may be input to the processor 501 as a control signal for processing. Here, the display screen 505 may be used to provide a virtual button and/or a virtual keyboard, which is also referred to as a soft button and/or a soft keyboard. In an example, a single display screen 505 may be disposed on a front panel of the electronic device 500. In another example, at least two display screens 505 may be respectively disposed on different surfaces of the electronic device 500 or designed in a foldable shape. In another example, the display screen 505 may be a flexible display screen, disposed on a curved surface or a folded surface of the electronic device 500. The display screen 505 may be set in a non-rectangular irregular pattern, that is, a screen with a special shape. The display screen 505 may be manufactured using a material such as a liquid crystal display (LCD), an organic light-emitting diode (OLED), or the like.

The camera 506 may be used to collect an image or video. Optionally, the camera 506 may include a front-facing camera and a rear-facing camera. Generally, a front-facing camera is set on a front panel of a terminal, and a rear-facing camera is set on a rear face of the terminal. In some examples, at least two rear-facing cameras may be provided and may include, for example, one of a main camera, a depth-of-field camera, a wide-angle camera, and a telephoto camera, to implement a background blur function through fusion of the main camera and the depth-of-field camera, panoramic photo shooting and virtual reality (VR) shooting functions through fusion of the main camera and the wide-angle camera, or other fusion shooting functions. In some examples, the camera 506 may also include a flash. The flash may be a single color temperature flash or a double color temperature flash, as non-limiting examples. The double color temperature flash may refer to a combination of a warm flash and a cold flash, and may be used to perform light compensation at different color temperatures.

The audio circuit 507 may include a microphone and a speaker. The microphone may be used to collect sound waves of a user and an environment, convert the sound waves into electric signals and input the electric signals to the processor 501 for processing, or to the RF circuit 504 to implement voice communication. For a stereo sound collection or noise reduction, a plurality of microphones may be provided and respectively disposed at different portions of the electronic device 500. The microphone may also be a microphone array or an omnidirectional collection microphone. The speaker may be used to convert electric signals from the processor 501 or the RF circuit 504 into sound waves. The speaker may be a conventional thin-film speaker or a piezoelectric ceramic speaker. When the speaker is the piezoelectric ceramic speaker, electric signals may be converted into sound waves that can be heard by human, and may also be converted into sound waves that cannot be heard by human for ranging and other uses. In some examples, the audio circuit 507 may further include an earphone jack.

The location determining circuit 508 may be used to position a current geographic location of the electronic device 500 to implement a navigation or location based service (LBS). The location determining circuit 508 may be configured to determine a location of the electronic device based on the global positioning system (GPS) of the United States, the BeiDou system of China, the GLONASS system of Russia, or the GALILEO system of the European Union, as non-limiting examples.

The power supply 509 may be used to supply power to each component in the electronic device 500. The power supply 509 may be an alternating current (AC), a direct current (DC), a primary battery, or a rechargeable battery. When the power supply 509 includes a rechargeable battery, the rechargeable battery may be a wired rechargeable battery or a wireless rechargeable battery. The rechargeable battery may also be used to support a fast charging technology.

In some examples, the electronic device 500 may further include one or more sensors 510. The one or more sensors 510 may include, but are not limited to, an acceleration sensor 511, a gyro sensor 512, a pressure sensor 513, a fingerprint sensor 514, an optical sensor 515, and a proximity sensor 516.

The acceleration sensor 511 may detect a magnitude of acceleration on three coordinate axes of a coordinate system established by the electronic device 500. For example, the acceleration sensor 511 may be used to detect components of gravity acceleration on the three coordinate axes. The processor 501 may control the display screen 505 to display a UI in a frame view or a portrait view, according to a gravity acceleration signal collected by the acceleration sensor 511. The acceleration sensor 511 may also be used to collect motion data of a game or a user.

The gyro sensor 512 may sense a body direction and a rotation angle of the electronic device 500. The gyro sensor 512 may cooperate with the acceleration sensor 511 to collect a three-dimensional (3D) action by a user on the electronic device 500. The processor 501 may implement the following functions according to data collected by the gyro sensor 512: motion sensing (e.g., a change in a UI according to a tilt operation of a user); image stabilization during shooting; game control; and inertial navigation.

The pressure sensor 513 may be disposed on a side frame of the electronic device 500 and/or a lower layer of the display screen 505. When the pressure sensor 513 is on the side frame of the electronic device 500, a holding signal of the user on the electronic device 500 may be detected. The processor 501 may recognize left and right hands or perform a quick operation according to the holding signal collected by the pressure sensor 513. When the pressure sensor 513 is disposed on the lower layer of the display screen 505, the processor 501 may control an operable control on the UI according to a pressure operation of the user on the display screen 505. The operable control may include at least one of a button control, a scroll bar control, an icon control, or a menu control.

The fingerprint sensor 514 may be used to collect a fingerprint of the user. The processor 501 may identify an identity of the user based on the fingerprint collected by the fingerprint sensor 514, or the fingerprint sensor 514 may identify the identity of the user based on the collected fingerprint. If the identity of the user is identified as a trusted identity, the processor 501 may authorize the user to perform a related sensitive operation that includes unlocking a screen, viewing encrypted information, downloading software, payment and changing settings. The fingerprint sensor 514 may be disposed on a front face, a rear face, or a side face of the electronic device 500. When the electronic device 500 is provided with a physical key or a vendor logo, the fingerprint sensor 514 may be integrated with the physical button or the vendor logo.

The optical sensor 515 may be used to collect ambient light intensity. In an example, the processor 501 may control a display brightness of the display screen 505 according to the ambient light intensity collected by the optical sensor 515. Specifically, when the ambient light intensity is relatively high, the display brightness of the display screen 505 may be increased. When the ambient light intensity is relatively low, the display brightness of the display screen 505 may be reduced. In another example, the processor 501 may dynamically adjust shooting parameters of the camera 506 according to the ambient light intensity collected by the optical sensor 515.

The proximity sensor 516, also referred to as a distance sensor, is generally provided on the front panel of the electronic device 500. The proximity sensor 516 may be used to collect a distance between the user and the front face of the electronic device 500. In an example, when the proximity sensor 516 detects that the distance between the user and the front face of the electronic device 500 gradually decreases, the processor 501 may control the display screen 505 to switch from a screen-on state to a screen-off state. When the proximity sensor 516 detects that the distance between the user and the front face of the electronic device 500 gradually increases, the processor 501 may control the display screen 505 to switch from the screen-off state to the screen-on state.

Other than the processor 501, examples of the electronic device 500 of FIG. 5 are not limited by the above descriptions of example components that may be included in the electronic device 500, as the electronic device 500 may include more components or fewer components than those shown in the drawing, or some components may be combined, and/or alternate components may be included in the electronic device 500.

The computing apparatuses, the electronic devices, the processors, the memories, the peripheral interfaces, the RF circuit, the display screen, the camera, the audio circuit, the location determining circuit, the power supply, the acceleration circuit, gyro sensor, pressure sensor, fingerprint sensor, optical sensor, proximity sensor, and other apparatuses, devices, units, modules, and components described herein with respect to FIGS. 1-5 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method, the method comprising:
   generating a multi-stage feature map for landmarks of a face image through a staged convolutional network;
   generating an initial query matrix by fully connecting a last-stage feature map in the multi-stage feature map using a fully connected network, where a total number of feature elements in the initial query matrix is equal to a total number of predicted landmarks of the face image;
   generating a memory feature matrix by flattening and connecting feature maps of different sizes in the multi-stage feature map; and
   generating predicted landmark coordinates by inputting the memory feature matrix and the initial query matrix to a decoder network of plural cascaded decoder networks.

2. The method of claim 1, wherein the multi-stage feature map includes pyramid features that represent extracted local features of the face image and extracted global features of the face image.

3. The method of claim 1, wherein
   the decoder networks, including a first decoder network and two or more second decoder networks, are configured as cascaded transformers and each comprises a self-attention portion and a landmark coordinate prediction portion, and each of the two or more second decoder networks further includes a deformable attention portion, and
   the generating of the predicted landmark coordinates further comprises:
   inputting the initial query matrix and the initial query matrix embedded with position information to a first self-attention portion of the first decoder network, as inputs among query, key, and value inputs of the first self-attention portion;
   generating an output of a corresponding deformable attention portion of a second decoder network, of the two or more second decoder networks, by implementing the deformable attention portion provided an output of a second self-attention portion of the second decoder network, a memory feature matrix, and first landmark coordinates predicted by the first decoder network to the corresponding deformable attention portion of the second decoder network, where the output of the second self-attention portion and the memory feature matrix are respective query and value inputs of the corresponding deformable attention network;
   inputting the output of the corresponding deformable attention portion of the second decoder network and the output of the corresponding deformable attention portion with the embedded position information to another self-attention portion of another second decoder network, of the two or more second decoder networks, as inputs among query, key, and value inputs to the other self-attention portion; and
   generating other second landmark coordinates of the face image predicted by the other second decoder network by providing information, based on the output of the corresponding deformable attention portion of the second decoder network, to a corresponding landmark coordinate prediction portion of the other second decoder network,
   wherein landmark coordinates predicted by a cascaded last decoder network, of the two or more second decoder networks, are last predicted landmark coordinates of a final face image corresponding to the face image.

4. The method of claim 3, wherein
an output of a respective self-attention portion, of the decoder networks, is an output matrix obtained in accordance with the following equation:

$$q_i^E = \sum_{j=1}^{N} \alpha_{ij} q_j, i = 1, 2, \ldots N$$

wherein $q_i^E$ denotes an i-th row vector of the output matrix, $\alpha_{ij}$ denotes an attention weight obtained by normalizing a dot product of an i-th row vector of a query matrix input to the respective self-attention portion and a j-th row vector of a key matrix input to the respective self-attention portion, $q_j$ denotes a j-th row vector of the initial query matrix or a query matrix based on an output matrix of a previous deformable attention portion of a previous second decoder network, of the two or more second decoder networks, and N denotes the total number of predicted landmarks of the face image.

5. The method of claim 4, wherein
an output of one deformable attention portion, of a corresponding decoder network among the two or more second decoder networks, is another output matrix obtained in accordance with the following equation:

$$f_i = \sum_{k=1}^{K} \beta_{ik} x_{ik}, i = 1, \ldots, N$$

wherein $f_i$ denotes an updated feature of an i-th landmark of an output matrix of a corresponding previous decoder network, of the decoder networks, $\beta_{ik}$ denotes an attention weight obtained by performing a fully connected operation and a softmax operation on a query matrix input to the one deformable attention portion, $x_{ik}$ denotes a feature corresponding to coordinates of a k-th reference point in the memory feature matrix, and K denotes a preset value, wherein a position offset between the coordinates of the k-th reference point and i-th landmark coordinates in landmark coordinates predicted by the corresponding previous decoder network is obtained by providing a result, of a fully connected operation on an output matrix of another deformable attention portion of the corresponding previous decoder network, to a corresponding landmark coordinate prediction portion of the corresponding previous decoder network.

6. The method of claim 3, wherein
corresponding landmark coordinates predicted by a corresponding second decoder network, among the two or more second decoder networks, are obtained in accordance with the following equation:

$$y = \sigma(y_O + \sigma^{-1}(y_R))$$

wherein y denotes landmark coordinates predicted by the corresponding second decoder network, $y_R$ denotes initial landmark coordinates predicted by the first decoder network or previous landmark coordinates predicted by a previous second decoder network, among the two or more decoder networks, and $y_O$ denotes an output of a landmark coordinate prediction portion of the corresponding second decoder network indicating an offset of y with respect to $y_R$.

7. The method of claim 3, further comprising training the convolutional neural network layer, the fully connected layer, and at least one decoder network of the decoder networks using a training image sample based on the following regression loss function:

$$L_{reg} = \sum_{l=0}^{L_d} \|y_l - \hat{y}\|$$

wherein $L_{reg}$ denotes a regression loss, $y_l$ denotes landmark coordinates of a training image sample predicted by an in-training decoder network, $\hat{y}$ denotes actual landmark coordinates of the training image sample, $L_d$ denotes a total number of in-training decoder networks, and l denotes an index of the in-training decoder network among the in-training decoder networks.

8. A non-transitory computer-readable storage medium storing instructions that, when executed by a processor, configures the processor to implement the method of claim 1.

9. An apparatus, the apparatus comprising:
at least one processor comprising processing circuitry; and
memory comprising one or more storage media storing instructions that, when executed by the at least one processor individually or collectively, cause the at least one processor to:
generate a multi-stage feature map for landmarks of a face image through a staged convolutional network;
generate an initial query matrix by fully connecting a last-stage feature map in the multi-stage feature map using a fully connected network, where a total number of feature elements in the initial query matrix is equal to a total number of predicted landmarks of the face image;
generate a memory feature matrix by flattening and connecting feature maps of different sizes in the multi-stage feature map; and
generate predicted landmark coordinates by inputting the memory feature matrix and the initial query matrix to a decoder network of plural cascaded decoder networks.

10. The apparatus of claim 9, wherein the multi-stage feature map includes pyramid features that represent extracted local features of the face image and extracted global features of the face image.

11. The apparatus of claim 9,
wherein the decoder networks, including a first decoder network and two or more second decoder networks, are configured as cascaded transformers and each comprises a self-attention portion and a landmark coordinate prediction portion, and each of the two or more second decoder networks further includes a deformable attention portion,
wherein the instructions, for implementation of the self-attention portion of an initial operation of the decoder network, when executed by the at least one processor individually or collectively, further cause the apparatus to:
input the initial query matrix and the initial query matrix embedded with position information to a first self-attention portion of the first decoder network, as inputs among query, key, and value inputs of the first self-attention portion;

generate an output of a corresponding deformable attention portion of a second decoder network, of the two or more second decoder networks, by implementing the deformable attention portion provided an output of a second self-attention portion of the second decoder network, a memory feature matrix, and first landmark coordinates predicted by the first decoder network to the corresponding deformable attention portion of the second decoder network, where the output of the second self-attention portion and the memory feature matrix are respective query and value inputs of the corresponding deformable attention network;

input the output of the corresponding deformable attention portion of the second decoder network and the output of the corresponding deformable attention portion with the embedded position information to another self-attention portion of another second decoder network, of the two or more second decoder networks, as inputs among query, key, and value inputs to the other self-attention portion; and generate second landmark coordinates of the face image predicted by the other second decoder network by providing information, based on the output of the corresponding deformable attention portion of the other second decoder network, to a corresponding landmark coordinate prediction portion of the other second decoder network, and wherein landmark coordinates predicted by a cascaded last decoder network, of the two or more second decoder networks, are last predicted landmark coordinates of a final face image corresponding to the face image.

12. The apparatus of claim 11, wherein the instructions, when executed by the at least one processor individually or collectively, further cause the apparatus to:

generate an output of a respective self-attention portion, of the decoder networks, in accordance with the following equation:

$$q_i^E = \sum_{j=1}^{N} \alpha_{ij} q_j, i = 1, 2, \ldots N$$

wherein $q_i^E$ denotes an i-th row vector of the output matrix, $\alpha_{ij}$ denotes an attention weight obtained by normalizing a dot product of an i-th row vector of a query matrix input to the respective self-attention portion and a j-th row vector of a key matrix input to the respective self-attention portion, $q_j$ denotes a j-th row vector of the initial query matrix or a query matrix based on an output matrix of a previous deformable attention portion of a previous second decoder network, of the two or more second decoder networks, and N denotes the total number of predicted landmarks of the face image.

13. The apparatus of claim 12, wherein the instructions, when executed by the at least one processor individually or collectively, further cause the apparatus to:

generate an output of one deformable attention portion, of a corresponding decoder network among the two or more second decoder networks, in accordance with the following equation:

$$f_i = \sum_{k=1}^{K} \beta_{ik} x_{ik}, i = 1, \ldots, N$$

wherein $f_i$ denotes an updated feature of an i-th landmark of an output matrix of a corresponding previous decoder network, of the decoder networks, $\beta_{ik}$ denotes an attention weight obtained by performing a fully connected operation and a softmax operation on a query matrix input to the one deformable attention portion, $x_{ik}$ denotes a feature corresponding to coordinates of a k-th reference point in the memory feature matrix, and K denotes a preset value, wherein a position offset between the coordinates of the k-th reference point and i-th landmark coordinates in landmark coordinates predicted by the corresponding previous decoder network is obtained by providing a result, of a fully connected operation on an output matrix of another deformable attention portion of the corresponding previous decoder network, to a corresponding landmark coordinate prediction portion of the corresponding previous decoder network.

14. The apparatus of claim 11, wherein the instructions, when executed by the at least one processor individually or collectively, further cause the apparatus to:

obtain corresponding landmark coordinates predicted by a corresponding second decoder network, among the two or more second decoder networks, in accordance with the following equation:

$$y = \sigma(y_O + \sigma^{-1}(y_R))$$

wherein y denotes landmark coordinates predicted by the corresponding second decoder network, $y_R$ denotes initial landmark coordinates predicted by the first decoder network or previous landmark coordinates predicted by a previous second decoder network, among the two or more decoder networks, and $y_O$ denotes an output of a landmark coordinate prediction portion of the corresponding second decoder network indicating an offset of y with respect to $y_R$.

15. The apparatus of claim 11, wherein the instructions, when executed by the at least one processor individually or collectively, further cause the apparatus to:

train the convolutional neural network layer, the fully connected layer, and at least one decoder network of the decoder networks, as respective neural network models, using a training image sample based on the following regression loss function:

$$L_{reg} = \sum_{l=0}^{L_d} \|y_l - \hat{y}\|$$

wherein $L_{reg}$ denotes a regression loss, $y_l$ denotes landmark coordinates of a training image sample predicted by an in-training decoder network, $\hat{y}$ denotes actual landmark coordinates of the training image sample, $L_d$ denotes a total number of in-training decoder networks, and l denotes an index of the in-training decoder network among the in-training decoder networks.

16. An apparatus, the apparatus comprising:

at least one processor comprising processing circuitry; and memory comprising one or more storage media storing instructions that, when executed by the at least one processor individually or collectively, cause the apparatus to:

for each decoder model of plural cascaded decoder models, implement a first attention mechanism based on landmark feature information for an input face image, implement a second attention mechanism, dependent on the first attention mechanism, to generate updated feature information dependent on multi-stage feature information for the face image and landmark coordinate information from a previous decoder model of the plural cascaded decoder models, and generate predicted landmark coordinates, or predicted landmark coordinate offsets, for the face image based on the generated updated feature information, wherein, for one of the decoder models, the landmark feature information is based on other feature information generated through an attention mechanism applied to initial query information having features extracted from a spatial dimension of features of a feature map generated by a multi-stage feature extraction model for the face image, wherein, for another one of the decoder models, the landmark feature information is updated feature information generated by a previous decoder model of the decoder models.

17. The apparatus of claim 16, wherein the multi-stage feature information represents features extracted by different stages, having different receptive fields, of the multi-stage feature extraction model.

18. The apparatus of claim 17, wherein the different receptive fields represent at least global and local features being extracted by the multi-stage feature extraction model, and the feature map generated by the multi-stage feature extraction model includes the extracted global features.

19. The apparatus of claim 16, wherein the implementation of the first attention mechanism is based on the landmark feature information embedded with position information.

20. The apparatus of claim 16, wherein a total number of the landmark feature information is equal to a total number of the predicted landmark coordinates.

* * * * *